Fig. 1

INVENTOR.
Glenn W. Way.
BY Corbett, Mahoney & Miller
ATTORNEYS

June 3, 1947.　　　　G. W. WAY　　　　2,421,472
ENDLESS TREAD INDUSTRIAL TRUCK
Filed Jan. 4, 1945　　　5 Sheets-Sheet 3

INVENTOR.
Glenn W. Way.
BY Corbett, Mahoney & Miller
ATTORNEYS

June 3, 1947.     G. W. WAY     2,421,472
ENDLESS TREAD INDUSTRIAL TRUCK
Filed Jan. 4, 1945     5 Sheets-Sheet 4

INVENTOR.
Glenn W. Way.
BY Corbett, Mahoney + Miller
ATTORNEYS

Patented June 3, 1947

2,421,472

UNITED STATES PATENT OFFICE 2,421,472

ENDLESS TREAD INDUSTRIAL TRUCK

Glenn W. Way, Delaware, Ohio

Application January 4, 1945, Serial No. 571,339

7 Claims. (Cl. 214—113)

The present invention relates to an endless tread industrial truck. More particularly, the invention has to do with trucks which are capable of handling heavy loads and which can be quickly and easily converted for use as bulldozers. Moreover, the invention has to do with the application to a vehicle of the foregoing character, of a work unit such, for example, as a scoop or shovel unit or attachment or a crane unit or attachment, it being understood that these units and the bulldozer unit are all interchangeable and serve to convert the vehicle into different desired types.

One of the objects of the invention is to provide a vehicle of the foregoing character having means for engaging and lifting extremely heavy loads without the danger of tilting or tipping of the vehicle.

Another object of the invention is to provide a vehicle of the foregoing character which is capable of being operated over uneven ground surfaces.

Presently known tractor lifts do not operate satisfactorily with heavy loads to be lifted and transported due primarily to the fact that the lift mechanism and the power plant are both located at the same end of the vehicle, there being no counterbalance for the load to prevent the vehicle from tilting toward the heavy end when the load is applied. It is, therefore, a further object of the present invention to provide a vehicle of the track laying type wherein the weight of the power plant serves to counterbalance the weight of the load and thus prevent tilting of the vehicle under the weight of heavy loads.

Another object of the invention is to provide a tractor lift which can be operated over unfinished roads, in fields, and in storage yards, as well as in loose and soft terrain such as swamps, sand dunes, beaches and bogs, and one which may likewise be operated in water without damaging the vehicle.

A further object of the invention is to provide an improved track laying type of vehicle having lift means which may be adjusted into various angular tilted positions whereby to permit the lift means to engage and remove objects which are embedded in the ground or other surface over which the vehicle is being operated.

A further object of the invention is to provide an improved vehicle of the foregoing character whose overall length is considerably less than that of previously known vehicles of this general nature; another object being to provide such an improved vehicle which is capable of being turned in much closer quarters then was possible with previously known vehicles of the tractor type.

Another object of the invention is to provide an improved vehicle of the foregoing character having improved maneuverability and one in which the tracks may be driven in opposite directions to permit the vehicle to turn and be operated in small spaces.

A further object of the invention is to provide a vehicle of the foregoing type which is capable of traveling up steel ramps, slopes and banks without the danger of binding or jamming of the lift mechanism of the vehicle.

Another object of the invention is to provide an improved vehicle of the track laying type having means to permit its rapid change-over from a tractor lift to a bulldozer by providing for the ready removal of the fork-type lift means and the substitution of a vertically adjustable plow or blade to convert the vehicle into a bulldozer.

A further object of the invention is to provide the vehicle with improved supporting means for the plow or blade so that the vehicle is capable of use as a snow plow, grader, or the like.

Another object of the invention is to provide an improved track laying type vehicle which is so arranged and constructed as to permit the vehicle operator to have full and complete vision at all times of the lift means, plow or blade, dependent upon whether or not the vehicle is being used as a lift or a bulldozer.

A further object of the present invention is to provide an improved vehicle of the foregoing type having improved supporting means for the ready attachment to and detachment of an improved scoop or shovel or an improved crane unit.

A further object of the invention is to provide an improved vehicle of the foregoing character in which the vehicle operator's seat is located at approximately the balance point or fulcrum to provide for easier riding conditions.

Generally speaking the improved vehicle of the present invention is preferably one of the track laying type which includes a frame structure and endless tracks which may be driven in opposite directions as well as in the same direction, the frame structure supporting at its rear end a power plant for driving the endless tracks and having at its front or opposite end means for operating a lift or for the attachment of a blade or plow member whereby to permit the vehicle to be converted from a tractor lift to a bulldozer. The frame structure also supports a seat for the vehicle operator which is located at approximately the balance point of the vehicle between the power plant and the lift means or bulldozer and at a vantage point which affords clear vision by the operator of the lift means or bulldozer attachment at all times. The lift means is preferably located between the endless tracks to conserve space and thus provide a vehicle of shorter overall length than previously known vehicles of this general nature. The lift means is not only capable of being raised and lowered but of being tilted into various predetermined positions to facilitate the engagement and lifting of various articles which otherwise could not be handled by the known types of tractor lifts.

The foregoing and other objects and advantages of the present invention will appear from the following description and appended claims when considered in connection with the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now to the drawings and particularly to Figs. 1 to 6, inclusive, thereof there is shown a preferred form of vehicle of the track laying type embodying the present invention. The vehicle is shown as a whole at A and includes a frame or chassis B. The frame B supports at one end, namely the rear end, a power plant shown as a whole at C. At the opposite end, the frame B supports an auxiliary upright frame shown as a whole at D. The frame D is provided with portions which are vertically adjustable and the entire frame is capable of being tilted forwardly or rearwardly with relation to the main frame, as shown in broken lines, Fig. 1. The auxiliary frame D is provided with means which permits the ready attachment to and removal of a preferably fork-like lift E or the similar attachment and removal of a bulldozer attachment, such as the plow or blade member F shown in Figs. 7 and 8 of the drawings.

The frame B also provides means for mounting a pair of endless tracks T which are of standard construction and which are mounted in conventional manner. Suitable drive mechanism (not shown) is provided to connect the tracks with the power plant so that the tracks may be driven in forward or reverse directions, means being provided to permit one of the tracks to be driven in a forward direction while at the same time the other track may be driven in the reverse direction. The drive mechanism is of conventional type although certain elements of the transmission gearing are rearranged so that the normal forward drive or movement of the vehicle is in the direction of the lift means end of the vehicle. The vehicle is provided with an operator's seat S which is located between the front and rear ends of the frame B at approximately the location of the balance point or fulcrum, indicated at 10 in Fig. 1.

The auxiliary frame D to which the lift means or the bulldozer attachment are applied and which serves to raise and lower these attachments, comprises outside or external guide channels 11 within which are telescoped slidable channels 12. The outer channels 11 are secured together at their upper ends, as shown, by a connecting channel member or bar 13 and the inner upright channel members 12 are interconnected at their upper ends by a channel member 14. The entire auxiliary frame D is pivotally mounted at 15 at opposite sides to suitable brackets carried by the frame structure B. Such arrangement permits the entire auxiliary frame D to be tilted forwardly as shown in broken lines at $D^1$ and rearwardly as shown at $D^2$, see Fig. 1.

Figure 1:
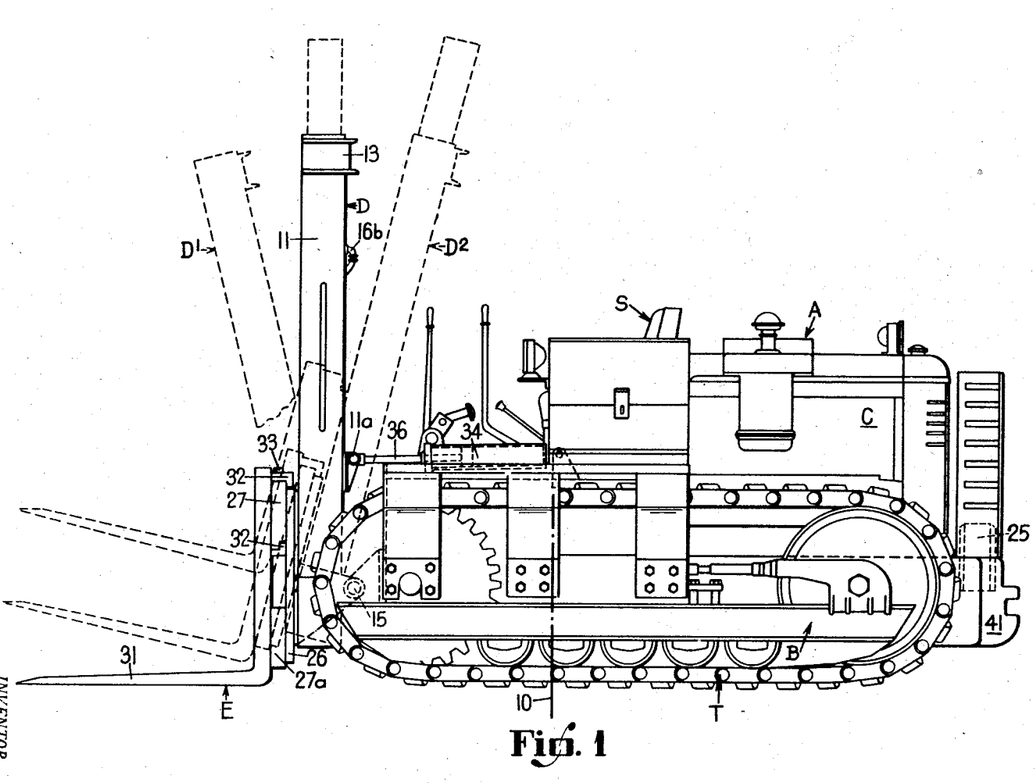
Fig. 1 is a side elevational view of a vehicle of the track laying type embodying the present invention.
Figure 2:
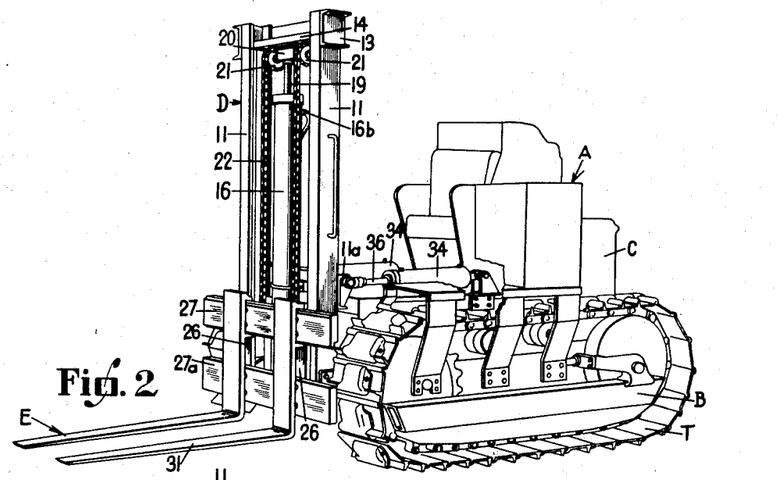
Fig. 2 is a perspective view of the vehicle of Fig. 1.

Means is provided for elevating or lowering the inner portion of the auxiliary frame comprising the members 12 and 14. Such means, as shown, comprises a vertical cylinder 16 whose lower end is sealed and supported by a bracket 17 carried on a fixed portion of the auxiliary frame and whose upper end is closed. A piston 18 mounted upon a piston rod 19 is located within the cylinder 16 and the upper end of the rod 19 is attached to a bracket 20 carried by the cross frame member or channel 14. The bracket 20 is provided with a pair of transversely spaced sprockets 21 over which a pair of sprocket chains 22 is adapted to travel. The inner or rear ends of the sprocket chains 22 are secured at 23 to a portion of the auxiliary frame which has no up and down movement, the opposite ends of the chains 22 being attached at 24 to a vertically movable portion of the auxiliary frame. Hydraulic power from a hydraulic pump 25, Fig. 1, is supplied through suitable piping (not shown) and through a port 16a to the underside of the piston 18 to elevate the piston and in turn raise the inner frame members 12 and 14. As the member 14 is elevated, the bracket 20 carried thereby will also be elevated and the forward portions or lengths of the chains 22 will be lifted. As these chains ride over the sprockets 21 it will be seen that the slidable frame portion 26 carrying the cross bars or members 27 and 27a will travel faster than the frame portions 12. Thus, the lift E will also move upwardly a greater distance than the movement of the frame members 12 and 14. The hydraulic fluid in the cylinder above the piston 18 will be forced out through the port 16b, Fig. 4, into the hydraulic system so as to allow the piston to travel upwardly. When it is desired to lower the lift E, hydraulic pressure is admitted through the port 16b to force the piston 18 downwardly to any desired position.

While I have mentioned the use of hydraulically actuated means for raising and/or lowering the inner portion of the auxiliary frame, it is to be understood that I may use either electrically or power-operated means for actuating the auxiliary frame.

The movable frame members or portions 26 are secured to brackets 28 carrying rollers 29 which rollers are adapted to ride on the flanges of the inner channels 12. Additional rollers 30 are carried by the brackets 28 and ride on the base portions or webs of the channels 12.

The cross bars 27 and 27a are secured, in any suitable manner, as by means of bolts 27b to the frame members 26 and the upper cross bar 27 is provided with a plurality of holes or sockets 27c formed in its upper edge.

Figure 3:
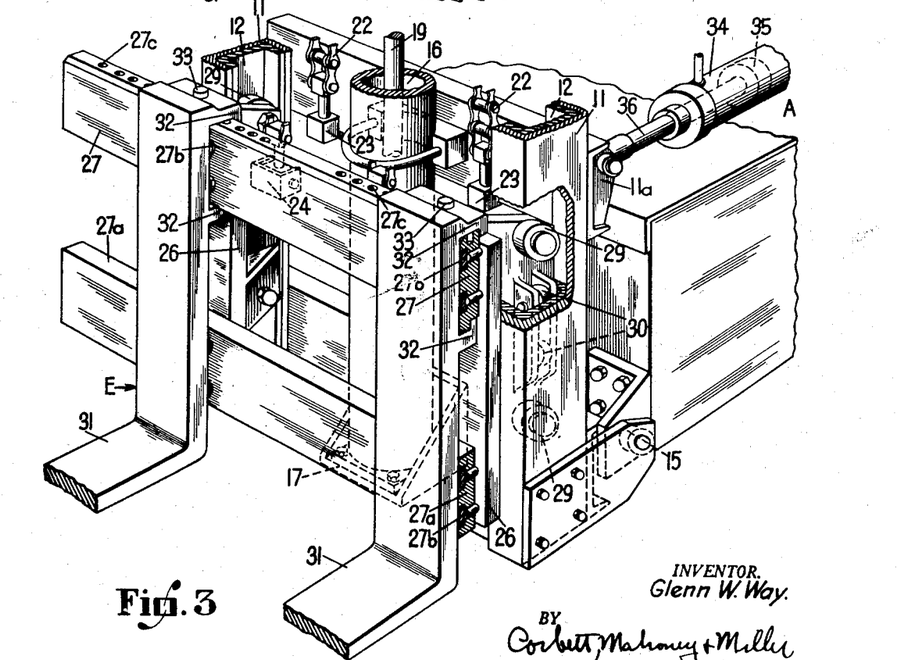
Fig. 3 is an enlarged detail fragmentary perspective view of the lift means and associated mechanism embodying the invention.
Figure 4:
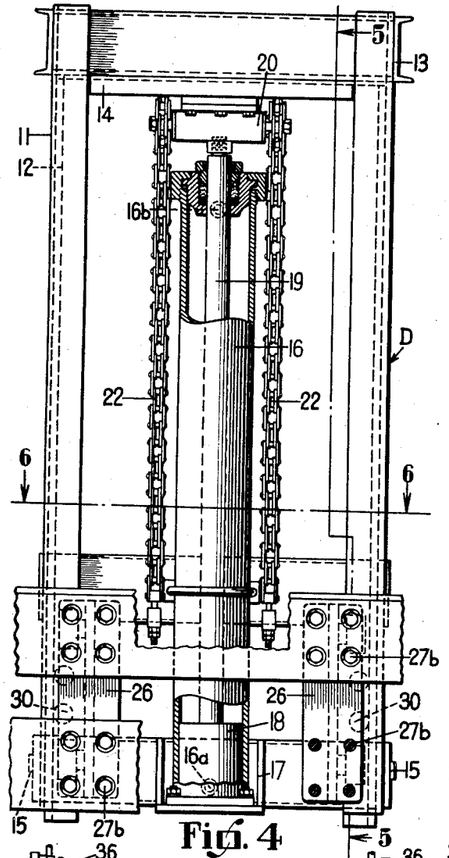
Fig. 4 is an elevational view, partly in section and partly broken away, taken substantially along the line 4—4 of Fig. 5, looking in the direction of the arrows.
Figure 5:
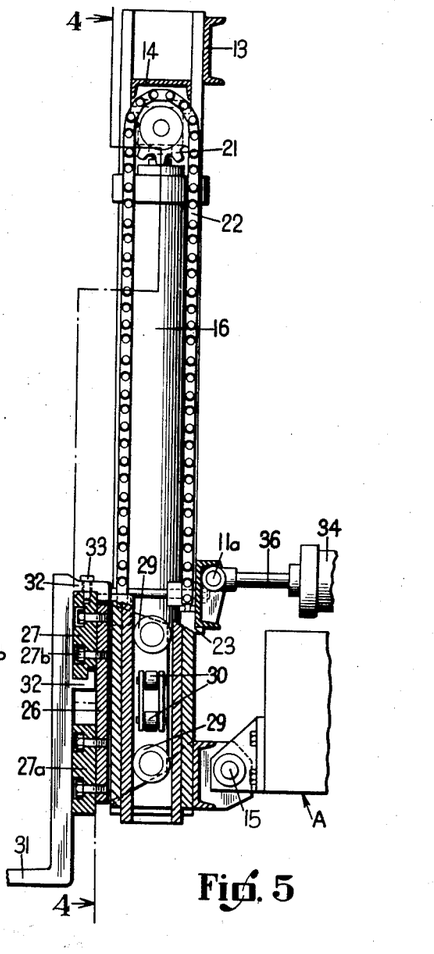
Fig. 5 is a vertical sectional view, partly in elevation, taken substantially along the line 5—5 of Fig. 4, looking in the direction of the arrows.
Figure 6:
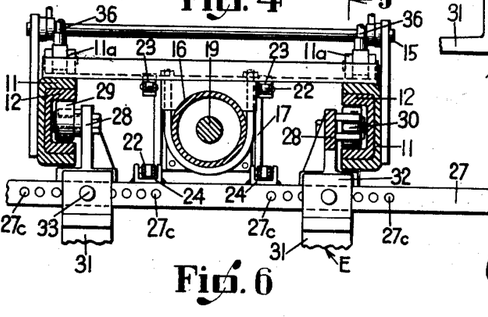
Fig. 6 is a horizontal sectional view taken substantially along the line 6—6 of Fig. 4, looking in the direction of the arrows.

The lift E, as shown, comprises a pair of substantially L-shaped members 31 having at their upper end portions substantially C-shaped sockets 32 which are adapted to be slid over the upper cross bar 27 to the desired positions and held in such positions against sliding movement by means of removable pins 33, see Fig. 3. Thus, the lift, as shown is of substantially fork-like structure with the members 31 thereof being adapted to be adjusted toward or away from one another along the cross bar 27 so as to provide a lift which is adjustable in width transversely of the vehicle. It will be understood that the lift members 31 may be easily and quickly applied to the cross bar or support 27 and likewise easily removed therefrom. When in position they rest against the lower cross bar 27a.

It is to be noted that the front end of the vehicle of the present invention consists of a minimum of parts or members for supporting the lift mechanism. The auxiliary frame, that is the frame including the upright channels 11 which do not have any up and down movement is pivotally connected, as previously described, at the points 15 to the vehicle main frame and the channels 11 are provided with brackets 11a to which the piston rods 36 of pistons 35 mounted in hydraulic cylinders 34, are attached. Thus, by supplying hydraulic fluid under pressure to the cylinders 34, the entire auxiliary frame D with its supported lift E may be swung from its full line vertical position shown in Fig. 1 to its forwardly tilted position shown at D¹ or to its rearwardly tilted position shown at D². No other means need be provided for supporting the upright or auxiliary frame D. Thus, the entire structure of the vehicle is greatly simplified and there are no unnecessary braces, supports, or connections which would tend to obscure the vision of the operator.

Figure 7:
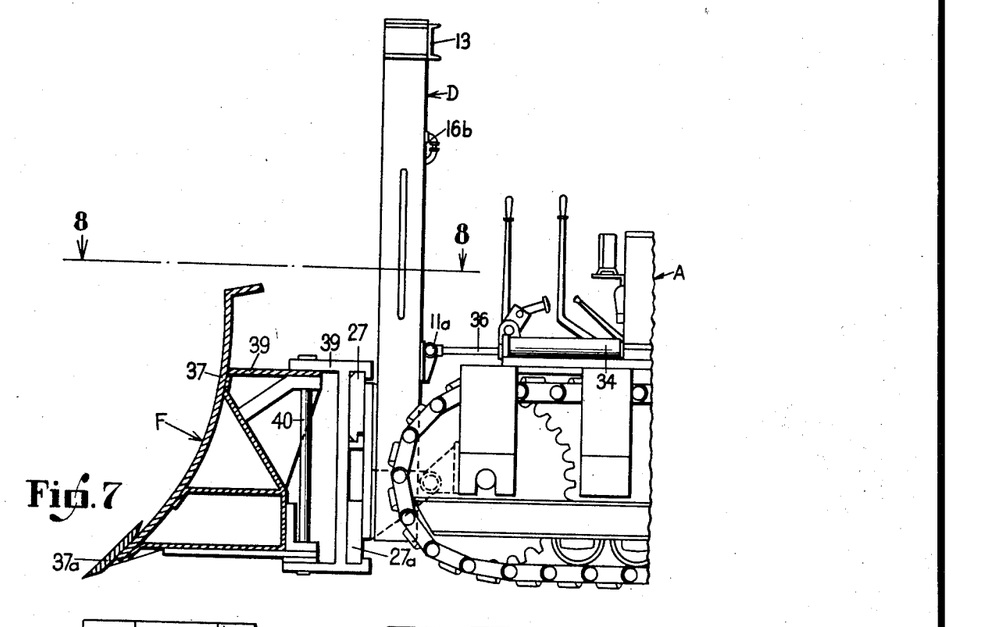
Fig. 7 is a fragmentary side elevational view, partly in section, of the vehicle shown in Fig. 1, with a bulldozer attachment or plow applied thereto.
Figure 8:
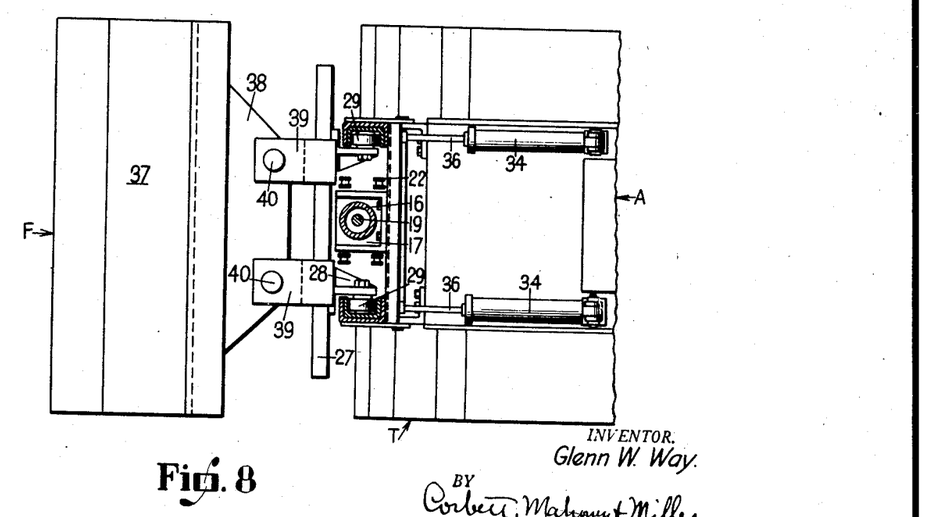
Fig. 8 is a top plan view, partly in section, taken substantially along the line 8—8 of Fig. 7, looking in the direction of the arrows.

Referring now to Figs. 7 and 8 of the drawings, the structure of the vehicle of the present invention is the same in these views as in the preceding views, the only difference being that the vehicle of Figs. 7 and 8 has been converted from a tractor lift to a bulldozer by providing in lieu of the lift means E, the bulldozer attachment blade or plow, shown as a whole at F. The bulldozer attachment F is in the form of a concave relatively large blade or plow 37 which normally extends transversely across the front of the vehicle and is detachably connected with the up and down movable section of the auxiliary or upright frame D. The plow is provided with a cutter blade 37a. The rear portion of the blade 37 is provided with an extension 38 carrying spaced brackets 39 which are mounted upon vertical shafts or rods 40. The inner or rear portions of the brackets are so shaped and proportioned as to slide over and firmly engage the cross bars or members 27 and 27a which are attached to the vertically movable portion of the auxiliary frame structure D. The brackets 39 may, if desired, be first assembled with the cross bars 27 and 27a and the plow or blade 37 attached thereto and held in place with relation to the brackets by the removable pins or rods 40; or, if desired, the brackets 39 which have previously been assembled with the bulldozer attachment or blade 37 may then be engaged with the cross bars and slid lengthwise thereof to the desired position. It will be understood that the bulldozer attachment F may be elevated with relation to the ground by actuating the hydraulic mechanism previously referred to and it may also be tilted toward or away from the front or forward end of the vehicle by actuating the hydraulic mechanism 34, also previously referred to.

It may be desirable to provide the machine of the present invention with suitable counterweight means which is auxiliary to that provided by the power plant C. In such case, a suitable counterweight 41 may be applied to the frame and extend beneath the crank case of the power plant and also serve as means for supporting the hydraulic pump 25, said auxiliary counterweight thereby serving as means for protecting the crank case and also the hydraulic pump. If desired, in addition to the auxiliary counterweight means, I may employ trailing auxiliary equipment (not shown) which may be attached to the rear portion of the tractor frame in any suitable manner. As a matter of fact, such auxiliary equipment may be employed in lieu of the auxiliary counterweight means. Such auxiliary equipment would serve nicely as counterweight means for the vehicle.

In operation, when it is desired to lift an object or a plurality of stacked objects by means of the lift E, the tractor vehicle is moved toward the object to position the fork-like lift means beneath said object. The hydraulic mechanism which includes the cylinder 16 is then employed to elevate the lift and the vehicle is propelled to the position where it is desired to deposit the load. If the deposit is to be made at a higher elevation than that at which the object is being carried, the auxiliary frame is further elevated to lift the object to the desired level. To discharge said object, the lift means E is either lowered, allowing the deposited object to remain at its new position or, if desired, the auxiliary frame D¹ may be tilted forwardly to discharge the article from its position upon the lift E.

Should it be desired to remove an object which is partially embedded in the ground by the fork-like lift E, the frame and the lift may be tilted forwardly to cause the members 31 of the lift to be inclined downwardly. Motive power is then applied to the tractor to move it forwardly and force the fork-like lift beneath the object to be removed. In this position the auxiliary frame may be again returned to its vertical position or to a rearwardly tilted position and the lift E elevated with the object supported thereby to be transported to any desired location.

The tractor lift of Figs. 1 to 6, inclusive, may be run up relatively steep ramps or other inclines and there is no danger of the lift E coming into contact with the surface for the reason that the auxiliary frame D and the lift may be tilted to their rear inclined position as shown at $D^2$, Fig. 1.

The vehicle of the present invention when used as a bulldozer, snow plow, or scraper, is likewise both vertically and angularly adjustable by means of the hydraulic mechanism previously referred to so that the desired work may be performed at various elevations with relation to the main ground or surface level.

One of the important features of the present invention, as pointed out above, has to do with the novel track laying vehicle having means which permit it to be used either in the capacity of a tractor lift or to be converted into a bulldozer, the lift means and the bulldozer attachment of the invention being readily interchangeable as well as readily applied to or removed from the vehicle.

The bulldozer attachment above-described has advantages over the standard type of bulldozer for the reason that with the hereindescribed structure the machine may be operated by a novice who can do a good job because of the adaptability of the bulldozer unit or attachment. On the other hand, the standard type of bulldozer can only be successfully manipulated by an expert operator.

Figures 9, 10:
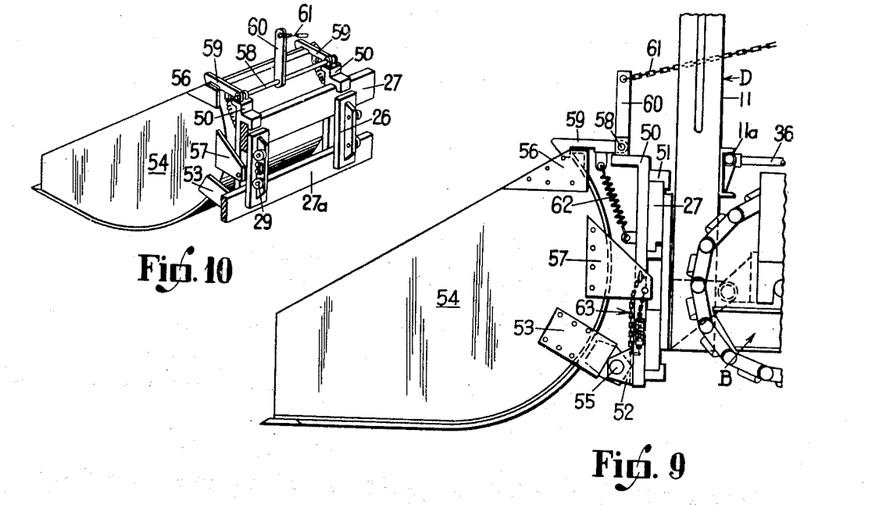
Fig. 9 is a side elevational view of the improved scoop or shovel attachment or unit for the vehicle of the present invention.
Fig. 10 is a fragmentary perspective view of the structure shown in Fig. 9.

Referring now to Figs. 9 and 10 of the drawings, there is shown in these figures a scoop or shovel unit or attachment for the vehicle or machine of the present invention. The attachment comprises a shovel or scoop supporting frame consisting of two upright members 50 having rearwardly projecting guide members or trackways 51. The frame members 50 are provided with forwardly projecting lugs or brackets 52 located at the lower ends of the members. A bracket 53 is rigidly connected to each end wall of the scoop or shovel 54 and is hingedly mounted at its rear end to the bracket 52 by a connecting pin 55. The end walls of the bucket 54 are provided at their upper ends with brace plates 56 and intermediate the members 53 and 56, the end walls are provided with additional rearwardly extending brackets 57. The upper ends of the upright members 50 carry a transversely extending rod 58 which is provided adjacent its opposite ends with latch members 59. A link 60 is connected to and rigidly mounted upon the rod 58 and serves to turn the rod and with it the latch members 59. The link 60 is adapted to be operated by the vehicle operator through the medium of a chain or cable 61 which extends rearwardly from the link to a point adjacent the vehicle operator's seat.

The latch members 59 are preferably maintained in latching engagement with the upper edge of the bucket 54 by means of springs 62, one such being shown in Fig. 9. It is desirable to cushion the bucket 54 when it is lowered to its discharging or dumping position. For this purpose, I have provided a cushioning device shown as a whole at 63 which consists of a chain secured at one end to the upright member 50 and at its opposite end to the bracket 57. Intermediate its length, the chain is provided with a standard spring-cushioned cylinder and piston check device. One of the cushioning means 63 is provided for each end of the scoop or bucket 54 and check the downward movement of the bucket.

It will be understood that the machine or vehicle to which the scoop or bucket member is applied is like that shown in the preceding views and that the guide members or trackways 51 are slid over the cross bars 27 and 27a of the slidable frame portion or auxiliary frame D.

Figure 11:
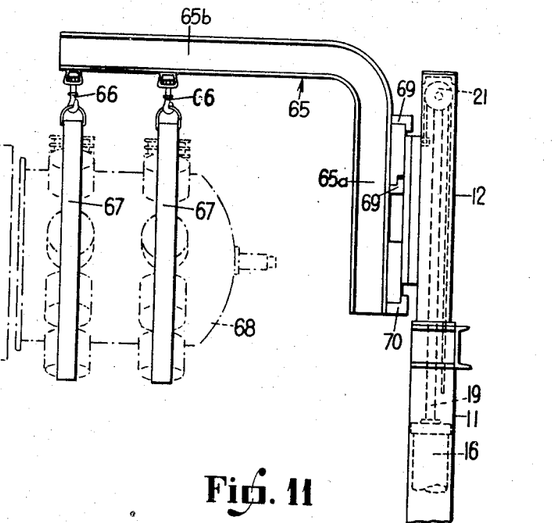
Fig. 11 is a side elevational view of the improved crane attachment or unit of the present invention.
Figure 12:
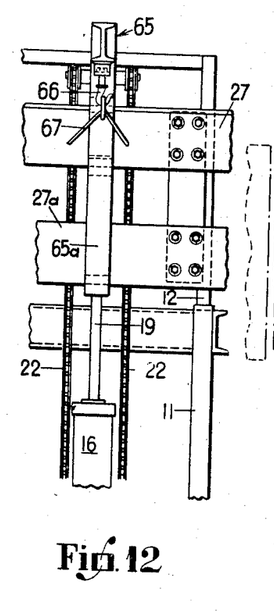
Fig. 12 is a fragmentary front elevational view, looking toward the right in Fig. 11, with the load removed to reveal the relationship of the parts.

Referring now particularly to Figs. 11 and 12 of the drawings, there is shown in these figures a crane attachment or unit embodying my invention. This crane unit is designated particularly for lifting and moving heavy objects in suspended position, such, for example, as aircraft engines, propellers, or the like.

The crane unit of the present invention comprises a substantially L-shaped I-beam member 65 having a vertically extending portion 65a and a horizontally positioned forwardly extending portion 65b. The portion 65b is provided with a pair of swively mounted supporting hooks 66 to which strap members or belts 67 are detachably connected. As shown, the strap members and hooks support an aircraft engine 68. While I have shown the present crane attachment as comprising only a single I-beam 65, it is to be understood that a pair of spaced I-beams may be employed, especially where the attachment or unit is to be used for lifting suspended articles of great weight and bulk.

As shown, the upright portion 65a of the I-beam is provided with a plurality of rearwardly projecting angle members 69 and 70. These angle members are adapted to be slid over and to engage the cross bars 27 and 27a of the slidable frame portion or auxiliary frame D of the tractor, it being noted that the pair of angles 69 engage the upper member 27, whereas the single lower angle 70 engages the member 27a. As in the preceding forms of the invention, the crane unit of Figs. 11 and 12 may be raised and lowered and tilted toward and away from the vehicle by which it is supported and carried. It will be understood that the unit may be quickly and easily applied to the members 27 and 27a and likewise quickly and easily removed therefrom.

Having thus described my invention, what I claim is:

1. An industrial truck comprising a chassis carried by traction means, an upright standard carried by the chassis, said standard comprising an outer frame section and an inner frame section which are in telescoping relationship, said outer frame section comprising a pair of inwardly facing external guide channels which are held in transversely spaced relationship, said inner frame section comprising a pair of inwardly facing internal channels which are held in transversely spaced relationship, said internal channels slidably fitting within and being guided by said external guide channels, a carriage mounted for vertical movement on the standard, said carriage including load-engaging means, said carriage also including rollers which operate between the flanges of said internal channels and rollers which engage the webs thereof to prevent both forward and reverse movement and transverse movement of the carriage relative to the standard, a pair of idler sprockets carried on the upper end of said inner frame section in transversely spaced relationship, a pair of chains passing over said sprockets and having one of their ends anchored to said outer frame section adjacent the lower end thereof and their other end anchored to said carriage, means for sliding the inner frame section relative to the outer frame section to extend and retract the standard vertically and to simultaneously move said carriage vertically in the inner frame section, said means comprising a vertically disposed cylinder and piston unit operatively connected to the inner frame section and to the outer frame section, a pivotal connection for said outer frame section whereby it is pivotally connected to said chassis at the lower end of said frame section, and means for tilting the standard about said pivotal connection, said means comprising a horizontally disposed cylinder and piston unit operatively connected to said chassis and to said outer frame section.

2. An industrial truck comprising a chassis carried by traction means, an upright standard carried by the chassis, said standard comprising an outer frame section and an inner frame section which are in telescoping relationship, said outer frame section comprising a pair of inwardly facing external guide channels which are held in transversely spaced relationship, said inner frame section comprising a pair of inwardly facing internal channels which are held in transversely spaced relationship, said internal channels slidably fitting within and being guided by said external guide channels, a carriage mounted for vertical movement on the standard, said carriage including load-engaging means, said carriage also including rollers which operate between the flanges of said internal channels and rollers which engage the webs thereof to prevent both forward and reverse movement and transverse movement of the carriage relative to the standard, a pair of idler sprockets carried on the upper end of said inner frame section in transversely spaced relationship, a pair of chains passing over said sprockets and having one of their ends anchored to said outer frame section adjacent the lower end thereof and their other end anchored to said carriage, and means for sliding the inner frame section relative to the outer frame section to extend and retract the standard vertically and to simultaneously move said carriage vertically in the inner frame section, said means comprising a vertically disposed cylinder and piston unit operatively connected to the inner frame section and to the outer frame section.

3. An industrial truck comprising a chassis carried by traction means, an upright standard carried by the chassis, said standard comprising an outer frame section and an inner frame section which are in telescoping relationship, said outer frame section comprising a pair of inwardly facing external guide channels which are held in transversely spaced relationship, said inner frame section comprising a pair of inwardly facing internal channels which are held in transversely spaced relationship, said internal channels slidably fitting within and being guided by said external guide channels, a carriage mounted for vertical movement on the standard, said carriage including load-engaging means, said carriage also including rollers which operate between the flanges of said internal channels and rollers which engage the webs thereof to prevent both forward and reversed movement and transverse movement of the carriage relative to the standard, a pair of idler sprockets carried on the upper end of said inner frame section in transversely spaced relationship, a pair of chains passing over said sprockets and having one of their ends anchored to said outer frame section adjacent the lower end thereof and their other end anchored to said carriage, and means for sliding the inner frame section relative to the outer frame section to extend and retract the standard vertically and to simultaneously move said carriage vertically in the inner frame section.

4. Apparatus according to claim 3 wherein the load-engaging means of the carriage comprises transversely extending vertically spaced supports which are secured to the carriage, L-shaped load-engaging members having their vertical portions engaging said transverse members and their horizontal portions extending forwardly, said L-shaped members having channel portions on the upper ends thereof which fit over the ends of the upper of said transverse members, and means for securing each of said channel portions to said upper transverse member at selected locations spaced therealong.

5. Apparatus according to claim 3 wherein the load-engaging means of the carriage comprises transversely extending vertically spaced supports which are secured to the carriage, L-shaped load-engaging members having their vertical portions engaging said transverse members and their horizontal portions extending forwardly, said L-shaped members having channel portions on the upper ends thereof which fit over the ends of the upper of said transverse members.

6. An industrial truck comprising a chassis carried by traction means, an upright standard carried by the chassis, said standard comprising an outer frame section and an inner frame section which are in telescoping relationship, said outer frame section comprising a pair of inwardly facing external guide channels which are held in transversely spaced relationship, said inner frame section comprising a pair of inwardly facing internal channels which are held in transversely spaced relationship, said internal channels slidably fitting within and being guided by said external guide channels, a carriage mounted for vertical movement on the standard, said carriage including load-engaging means, said carriage being provided with guide members which operate between the flanges of said internal channels, a pair of idler sprockets carried on the upper end of said inner frame section in transversely spaced relationship, a pair of chains passing over such sprockets and having one of their ends anchored to said outer frame section and their other end anchored to said carriage, means for sliding the inner frame section relative to the outer frame section to extend and retract the standard vertically and to simultaneously move said carriage vertically in the inner frame section, said load-engaging means of the carriage comprising a scoop, a frame for supporting said scoop and including upright frame members, a pivot structure for connecting said scoop to the lower ends of said frame members, releasable latch means associated with the frame members and the scoop, said frame members including channel-shaped portions, and transverse frame members attached to said carriage and over the ends of which said channel-shaped portions may be slipped.

7. An industrial truck comprising a chassis carried by traction means, an upright standard carried by the chassis, said standard comprising an outer frame section and an inner frame section which are in telescoping relationship, said outer frame section comprising a pair of inwardly facing external guide channels which are held in transversely spaced relationship, said inner frame section comprising a pair of inwardly facing internal channels which are held in transversely spaced relationship, said internal channels slidably fitting within and being guided by said external guide channels, a carriage mounted for vertical movement on the standard, said carriage including load-engaging means, said carriage being provided with guide members which operate between the flanges of said internal channels, a pair of idler sprockets carried on the upper end of said inner frame section in transversely spaced relationship, a pair of chains passing over such sprockets and having one of their ends anchored to said outer frame section and their other end anchored to said carriage, and means for sliding the inner frame section relative to the outer frame section to extend and retract the standard vertically and to simultaneously move said carriage vertically in the inner frame section, said load-engaging means of the carriage being provided with channel portions which slip over the ends of vertically spaced transversely extending frame members carried by the carriage.

GLENN W. WAY.

REFERENCES CITED

The following references are of record in the file of this patent:

UNITED STATES PATENTS

| Number | Name | Date |
|---|---|---|
| 2,368,122 | Dunham | Jan. 30, 1945 |
| 2,362,129 | Gfrorer | Nov. 7, 1944 |
| 2,341,853 | Austin | Feb. 15, 1944 |
| 2,231,875 | Behnke et al. | Feb. 18, 1941 |
| 2,351,926 | Coates | June 20, 1941 |
| 2,068,825 | Stevenson | Jan. 26, 1937 |
| 1,912,816 | Anthony | June 6, 1933 |
| 2,264,512 | Dunham | Dec. 2, 1941 |
| 2,178,367 | Dunham | Oct. 31, 1939 |
| 2,220,450 | Howell | Nov. 5, 1940 |
| 1,785,122 | Hughes | Dec. 16, 1930 |
| 2,307,655 | Arps | Jan. 5, 1943 |
| 1,713,780 | Remde | May 21, 1929 |
| 2,386,519 | Wagner et al. | Oct. 9, 1946 |
| 2,381,729 | Dunham et al. | Aug. 7, 1945 |
| 1,991,576 | Remde | Feb. 19, 1935 |
| 2,178,370 | Dunham | Oct. 31, 1939 |